Aug. 8, 1933.     C. A. BRACKELSBERG     1,921,114
METHOD AND APPARATUS FOR PRODUCING ROLLED BODIES FROM POWDEROUS MATERIALS
Filed Nov. 30, 1929     5 Sheets-Sheet 1
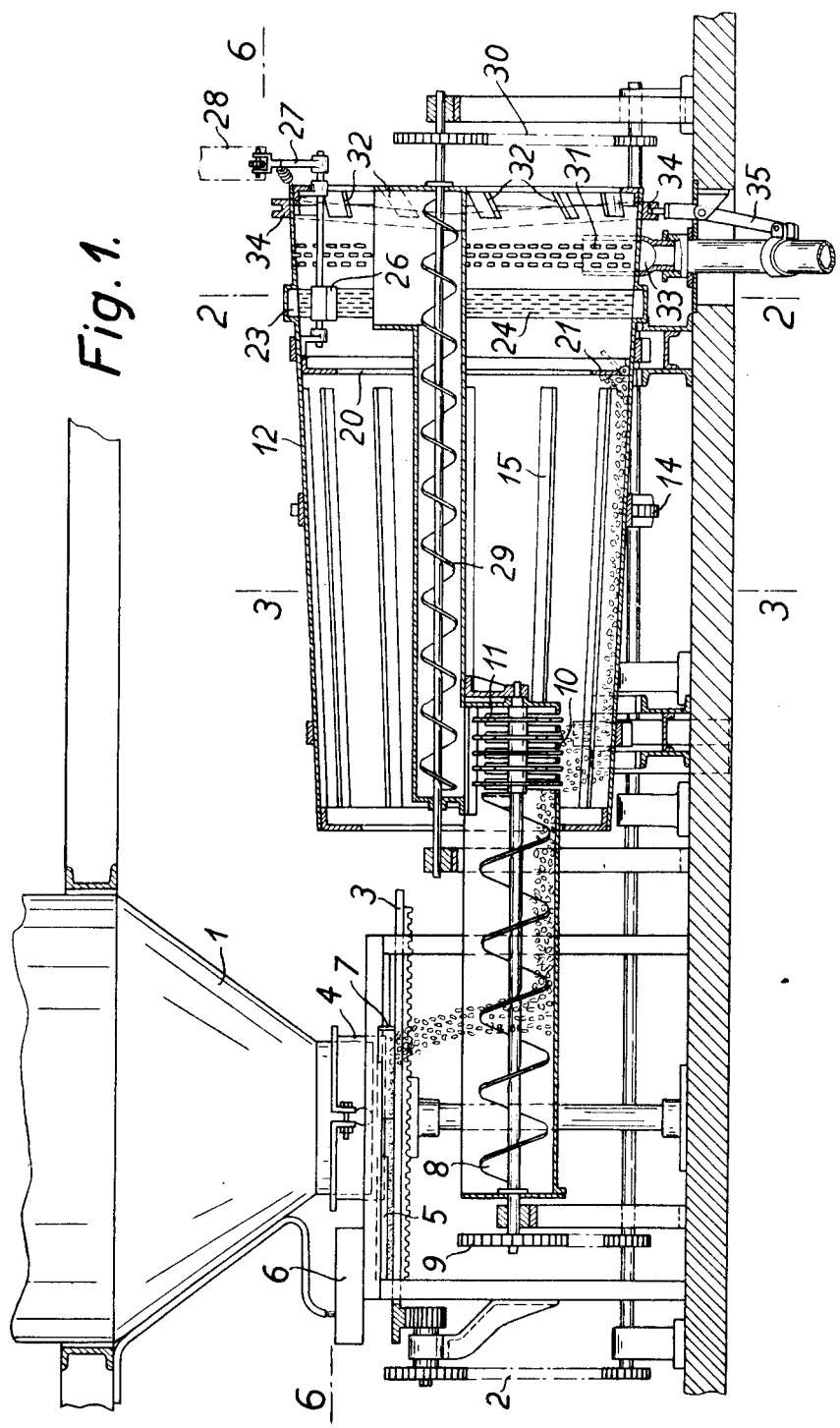

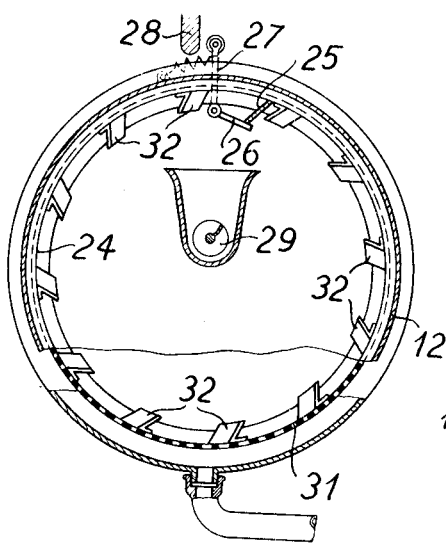
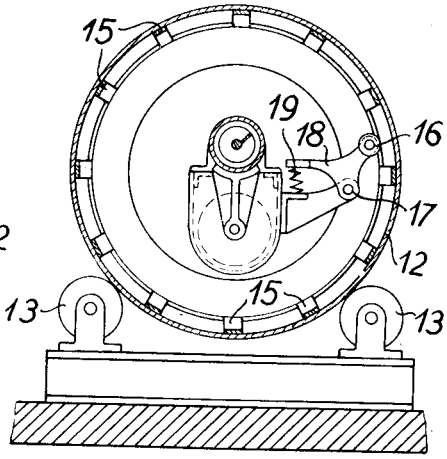
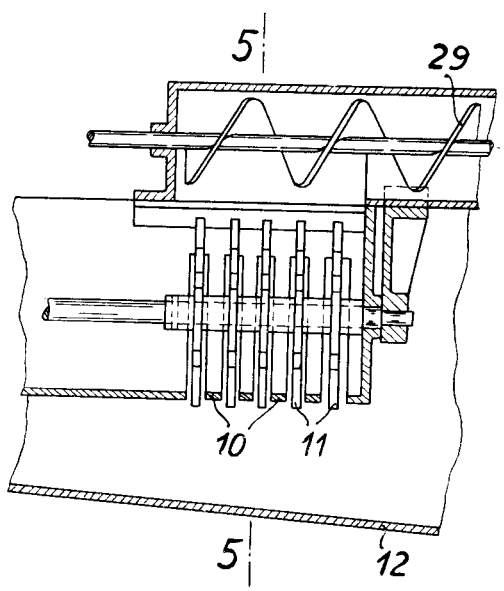
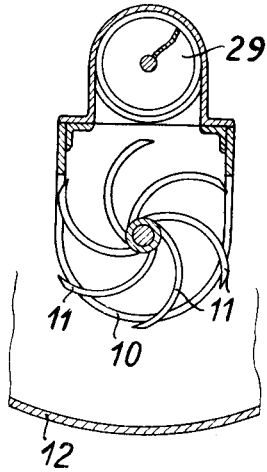

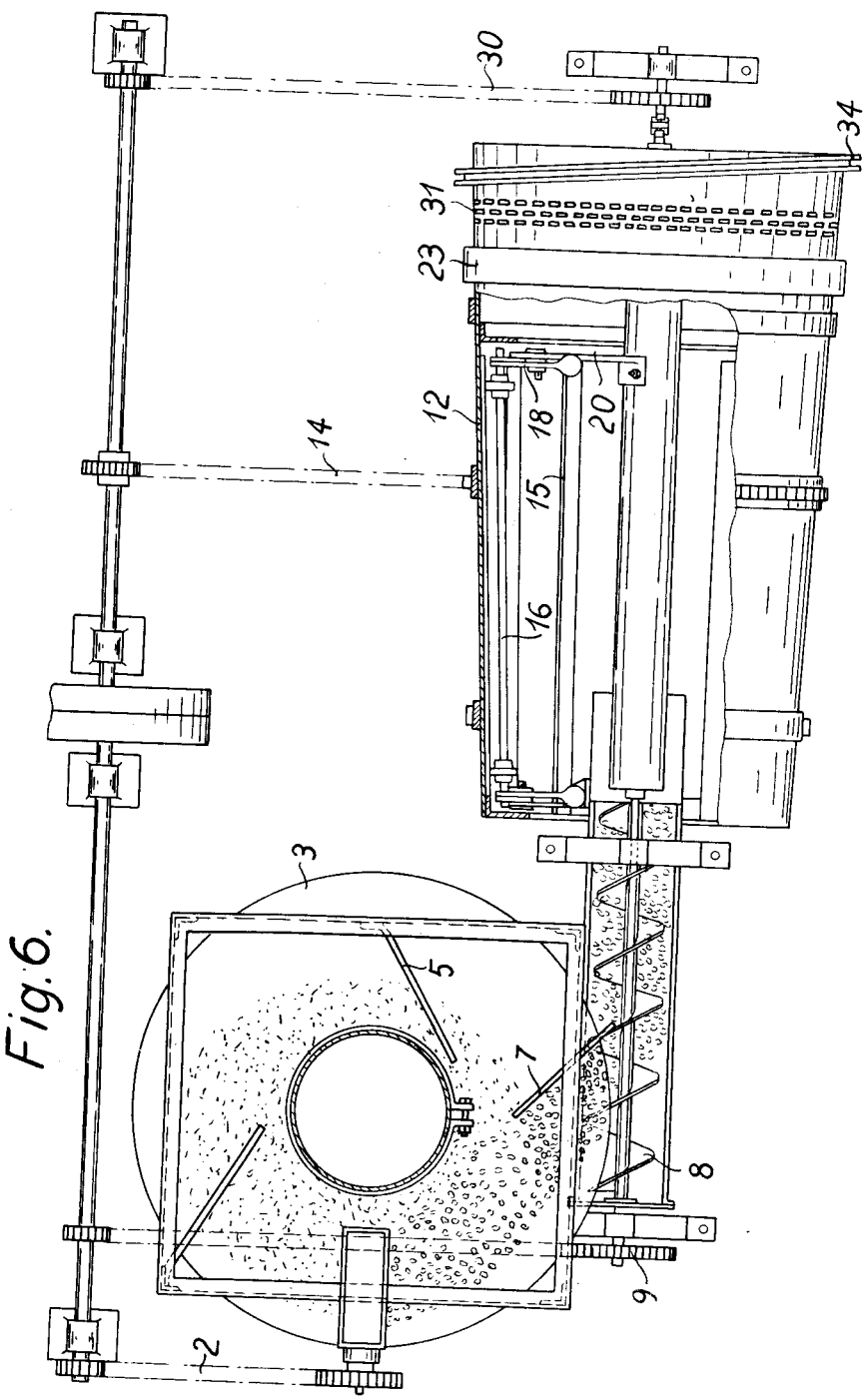

Aug. 8, 1933.  C. A. BRACKELSBERG  1,921,114
METHOD AND APPARATUS FOR PRODUCING ROLLED BODIES FROM POWDEROUS MATERIALS
Filed Nov. 30, 1929  5 Sheets-Sheet 5
Fig. 8.
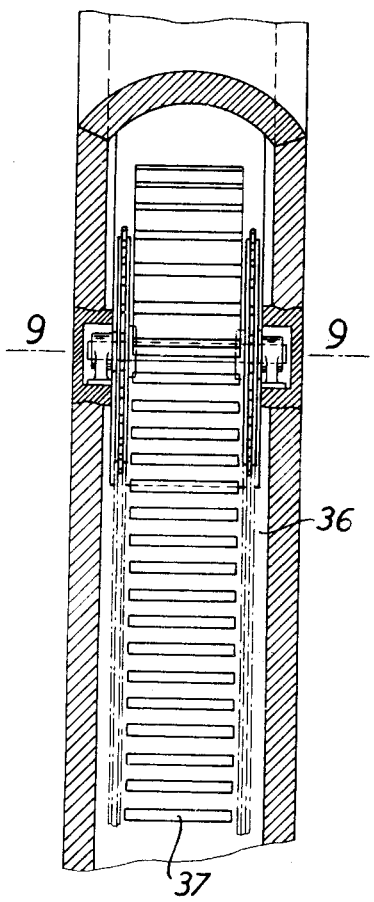
Fig. 9.
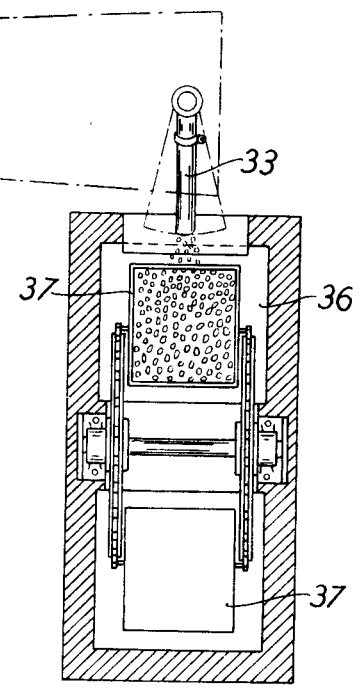
Fig. 10.
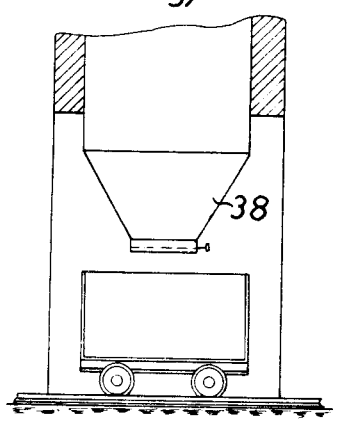
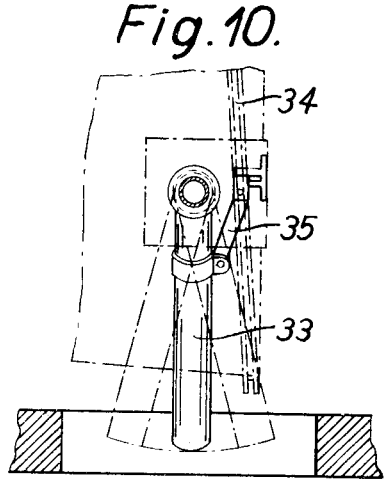

Patented Aug. 8, 1933

1,921,114

UNITED STATES PATENT OFFICE 1,921,114

METHOD AND APPARATUS FOR PRODUCING ROLLED BODIES FROM POWDEROUS MATERIALS

Carl Adolf Brackelsberg, Hemer, Germany

Application November 30, 1929, Serial No. 410,770, and in Germany December 3, 1928

8 Claims. (Cl. 18—5)

It has become known, to produce in a special apparatus rolled bodies (agglomerates) by moistening powderous material with solutions.

At the working with such apparatus difficulties occur, which reduce the efficiency of the plant and frequently cause interruptions of service.

This invention has for its object to obviate these inconveniences.

Differing from the known method the powderous material is supplied and moistened by forming continually on a rotary plate a layer of powderous material of any desired thickness and by moistening this layer with the aid of a device in such a manner, that not the whole surface but only spacially separated portions are moistened. In this manner a mass is obtained, which consists of little lumps held together by moisture and of powder. This mass is conveyed, by a screw conveyer having a grate at the delivering end by which the too large lumps are disintegrated, into a drum, and formed in the drum by rotation of the same into ball shaped bodies, which are then conveyed to a drying device.

As the particles are bound together by crystallization or crust formation of the matrice, the rolled bodies are not moved at the drying, but dried in the state of rest, in order to avoid any disturbing of the binding process, which might be caused by the movement of the rolled bodies.

The apparatus adapted to the improved method is illustrated by way of example in the accompanying drawings in which:—

Fig. 1 is a longitudinal section of the machine.

Fig. 2 is a section on line 2—2 of Fig. 1, viewed from the left.

Fig. 3 is a section on line 3—3 of Fig. 1, viewed from the right.

Fig. 4 is a detail of Fig. 1 on enlarged scale.

Fig. 5 is a section on line 5—5 of Fig. 4, viewed from the left.

Fig. 6 is a section on line 6—6 of Fig. 1 viewed from above.

Fig. 8 is a side elevation of Fig. 7.

Fig. 9 is a section on line 9—9 of Fig. 8 viewed from above.

Fig. 10 shows an enlarged illustration of the delivery device for the rolled bodies.

Figure 7:
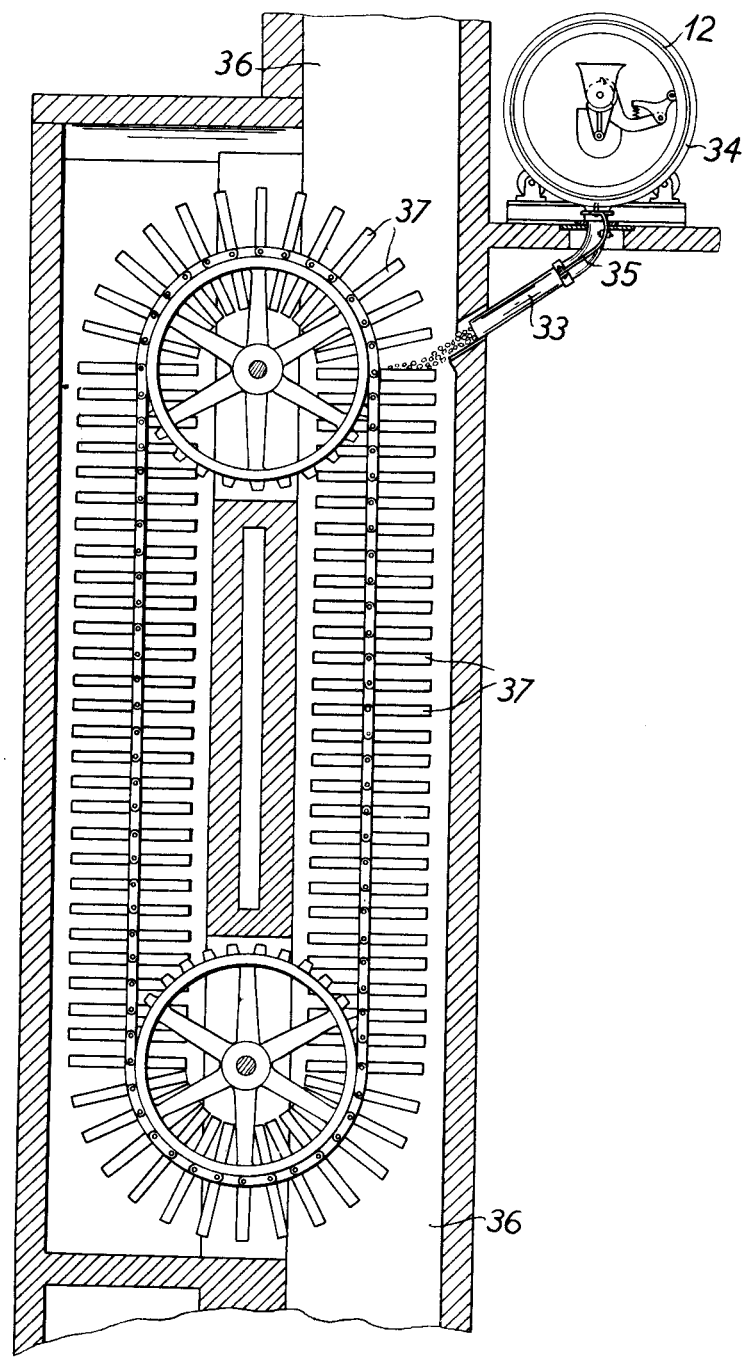
Fig. 7 shows the drying device for the rolled bodies in front elevation.

The charging hopper 1 is suspended in axial direction upon a rotary plate 3 rotated by a driving gear 2 and has at its lower end a vertically adjustable ring 4 designed to regulate the quantity of powderous material flowing out of the charging hopper 1 at the rotating of the plate 3. To spread out this powder in a uniform layer, bars 5 (Fig. 6), adjustable in vertical direction, are arranged above the plate 3, and a drop-device 6 is provided for moistening the powder. A bar 7 (Fig. 6) serves to scrape the moistened powder off the plate 3 and to throw the mixture into the screw conveyer 8 arranged under the plate 3.

The screw conveyer 8 is driven by a sprocket wheel gear 9. Its free end merges into a grate 10, through the gaps of which arms 11 project which are fixed on the axle of the conveyer screw, distribute the material and force the same through the grate gaps. As the grate projects into a conical drum 12 the material drops into this drum which is mounted on rollers 13 and driven by a chain and sprocket wheel gear 14. At the rotating of the drum balls are formed from the moist lumps, onto which the powderous material settles. If the inner surface of the drum 12 were smooth, no ball formation could take place, as the material would slide on the smooth surface so that, to prevent sliding of the material, ribs 15 are provided on the inner surface of the drum 12.

This drum supplies ball-shaped rolled bodies. The regular formation of these bodies will cease as soon as moist material sticks to the drum wall and these deposits, becoming gradually bigger, detach from the drum wall and and drop into the drum. A stripper bar 16 arranged in the drum serves to prevent the formation of deposits, said bar being fixed on a revolvable axle 17 and controlled by an arm 18 having a roller at its end. The bar 16 is adjusted so that it does not touch the inner surface of the wall of the drum. When the drum is rotating, the ribs 15 pass under the roller and lift the arm 18 and through the same the bar 16 so that this bar does not strike against the ribs 15. When the ribs 15 have passed along the stripper bar 16, this bar is again pressed against the drum wall by the action of a spring 19. This device prevents the formation of deposits on the drum wall. A regular continual service of great efficiency can be obtained only by this device.

In the drum 12 a ring 20 is further arranged, which has a door 21 and serves to dam up the material in the drum, in order that more solid balls are formed and more powder is taken up by the balls.

The material formed into ball-shaped rolled bodies is then conducted over a sifter, in order to remove the fine powder from the balls and to return it into the screw conveyer 8.

This sifter consists of a gutter shaped ring 23 on the circumference of the drum 12, the inner side of said ring being closed by a sieve 24.

To lift the fine material collecting, the gutter shaped ring 23 has a partition 25 adapted to be lifted by a flap 26 hingedly mounted on the sieve. The flap 26 is fixed to an arm 27, held in the closing position by the action of a spring. In its highest position the lever 27 strikes against an abutment 28 so that the flap is opened and the fine powderous material drops into the funnel of a screw conveyer 29 driven by a driving gear 30 and designed to convey the fine material into the screw conveyer 8 (Fig. 1).

The rolled bodies separated from the fine material consist of balls of different sizes. These balls pass through a sieve 31 which retains the balls which are too thick. These thick balls are elevated by means of sheet metal plates 32 fixed in the end of the drum, then thrown into the screw conveyer 29 to be conveyed to where they are crushed and returned through the screw conveyer 8 into the drum 12.

The balls passing through the sieve 31 drop into a chute 33 having a delivering end oscillatable around the vertical axis. A reciprocating oscillating movement can be communicated to this delivery end by a guide ring 34 of zig-zag shape extending around the circumference of the drum and by an oscillatable lever 35 sliding on this guide ring.

The chute 33 projects into a heated shaft 36, in which a paternoster elevator is arranged, the buckets of which consist of shallow boxes 37.

By the oscillating movement of the chute 33 the balls are made to roll into these boxes 37 to travel towards the fire, so that the moisture is evaporated and the balls become solid, whereupon they are delivered into a reservoir 38.

I claim:—

1. A machine for producing rolled bodies from powderous material, comprising in combination a charging hopper, a rotary plate under said hopper, a screw conveyer under said plate, a grate in the delivery end of said screw conveyer, and a rotatable drum into which is conveyed the material forced through said grate.

2. A machine for producing rolled bodies from powderous material, comprising in combination a charging hopper, a rotary plate under said hopper, a screw conveyer under said plate, a grate in the delivery end of said screw conveyer, a rotatable drum into which is conveyed the material forced through said grate, and ribs on the inner surface of said drum to prevent sliding of said powderous material on the inner surface of said drum.

3. A machine for producing rolled bodies from powderous material, comprising in combination a charging hopper, a rotary plate under said hopper, a screw conveyer under said plate, a grate in the delivery end of said screw conveyer a rotatable drum into which is conveyed the material forced through said grate, ribs on the inner surface of said drum to prevent sliding of said powderous material on the inner surface of said drum, and a spring controlled scraper hingedly fixed on the inner surface of said drum adapted to prevent formation of deposits on said inner surface.

4. A machine for producing rolled bodies from powderous material, comprising in combination a charging hopper, a rotary plate under said hopper, a screw conveyer under said plate, a grate in the delivery end of said screw conveyer, a rotatable drum into which is conveyed the material forced through said grate, ribs on the inner surface of said drum to prevent sliding of said powderous material on the inner surface of said drum, a spring controlled scraper hingedly fixed on the inner surface of said drum adapted to prevent formation of deposits on said inner surface, a baffling ring in said drum, and a door in said baffling ring.

5. A machine for producing rolled bodies from powderous material, comprising in combination a charging hopper, a rotary plate under said hopper, a screw conveyer under said plate, a grate in the delivery end of said screw conveyer, a rotatable drum into which is conveyed the material forced through said grate, ribs on the inner surface of said drum to prevent sliding of said powderous material on the inner surface of said drum, a spring controlled scraper hingedly fixed on the inner surface of said drum adapted to prevent formation of deposits on said inner surface, a baffling ring in said drum, a door in said baffling ring, and a screening device in the delivery end of said drum for separating the too big rolled bodies and the bodies which are not big enough.

6. A machine for producing rolled bodies from powderous material, comprising in combination a charging hopper, a rotary plate under said hopper, a screw conveyer under said plate, a grate in the delivery end of said screw conveyer, a rotatable drum into which is conveyed the material forced through said grate, ribs on the inner surface of said drum to prevent sliding of said powderous material on the inner surface of said drum, a spring controlled scraper hingedly fixed on the inner surface of said drum adapted to prevent formation of deposits on said inner surface, a baffling ring in said drum, a door in said baffling ring, a screening device in the delivery end of said drum for separating the too big rolled bodies and the bodies which are not big enough, and a screw conveyer on said drum adapted to return to said grate the screened out fine material.

7. A machine for producing rolled bodies from powderous material, comprising in combination a charging hopper, a rotary plate under said hopper, a screw conveyer under said plate, a grate in the delivery end of said screw conveyer, a rotatable drum into which is conveyed the material forced through said grate, ribs on the inner surface of said drum to prevent sliding of said powderous material on the inner surface of said drum, a spring controlled scraper hingedly fixed on the inner surface of said drum adapted to prevent formation of deposits on said inner surface, a baffling ring in said drum, a door in said baffling ring, a screening device in the delivery end of said drum for separating the too big rolled bodies and the bodies which are not big enough, a screw conveyer on said drum adapted to return to said grate the screened out fine material, an oscillatable chute at the delivery end of said drum, a paternoster elevator at the end of said chute, and a drying shaft around said paternoster elevator.

8. A machine for producing rolled bodies from powderous material, comprising in combination a charging hopper, a rotary plate under said hopper, a screw conveyer under said plate, a grate in the delivery end of said screw conveyer, a rotatable drum into which is conveyed the material forced through said grate, ribs on the inner surface of said drum to prevent sliding of said powderous material on the inner surface of said drum, a spring controlled scraper hingedly fixed on the inner surface of said drum adapted to prevent formation of deposits on said inner surface, a baffling ring in said drum, a door in said baffling ring, a screening device in the delivery end of said drum for separating the too big rolled bodies and the bodies which are not big enough, a screw conveyer on said drum adapted to return to said grate the screened out fine material, an oscillatable chute at the delivery end of said drum, a paternoster elevator at the end of said chute, a drying shaft around said paternoster elevator, an oscillatable lever for oscillating said chute, and a zig-zag shaped guide ring on the circumference of said drum guiding said lever.

CARL ADOLF BRACKELSBERG.